United States Patent [19]

Cavalieri

[11] Patent Number: 4,483,517
[45] Date of Patent: Nov. 20, 1984

[54] TRACTIVE APPARATUS FOR HAULING A CABLE, A BAR OR A SIMILAR MEMBER

[75] Inventor: Michel Cavalieri, Vincennes, France

[73] Assignee: Secalt S.A., France

[21] Appl. No.: 481,124

[22] Filed: Apr. 1, 1983

[30] Foreign Application Priority Data

Apr. 1, 1982 [FR] France .................. 82 05678
Apr. 2, 1982 [FR] France .................. 82 05765

[51] Int. Cl.³ .............................................. B66D 3/02
[52] U.S. Cl. ................................ 254/254; 254/384; 226/112; 24/132 WL
[58] Field of Search ............. 254/254, 259, 243, 245, 254/246, 250, 251, 253, 258, 261, 384; 226/112, 158, 167; 24/132 WL, 133, 134 KB, 263 B

[56] References Cited

U.S. PATENT DOCUMENTS

| | | | |
|---|---|---|---|
| 1,979,555 | 11/1934 | Jakoubek | 254/253 |
| 3,824,653 | 7/1974 | Sholler | 254/254 X |
| 3,911,535 | 10/1975 | Mauron | 24/133 X |

FOREIGN PATENT DOCUMENTS

| | | | |
|---|---|---|---|
| 652678 | 11/1962 | Canada | 254/310 |
| 615887 | 2/1980 | Switzerland | 254/254 |

Primary Examiner—Stuart S. Levy
Assistant Examiner—Joseph J. Hail, III
Attorney, Agent, or Firm—William A. Drucker

[57] ABSTRACT

The tractive apparatus has two clamping grippers each comprising a pair of jaws actuated by clamping links connected to an operating lever through connecting links pivotably mounted on this lever on each side of a pivot pin of the lever situated in the extension of a guide bar on which one of the two jaws of each gripper slides, the two grippers moving in opposite directions while being clamped in one of the two directions of movement. The guide jaw of each gripper is formed by a hollow body which serves as housing and bearing point for one of the ends of a pre-clamping spring whose other end exerts its action on a clamping link actuating the other jaw of the same gripper.

9 Claims, 11 Drawing Figures

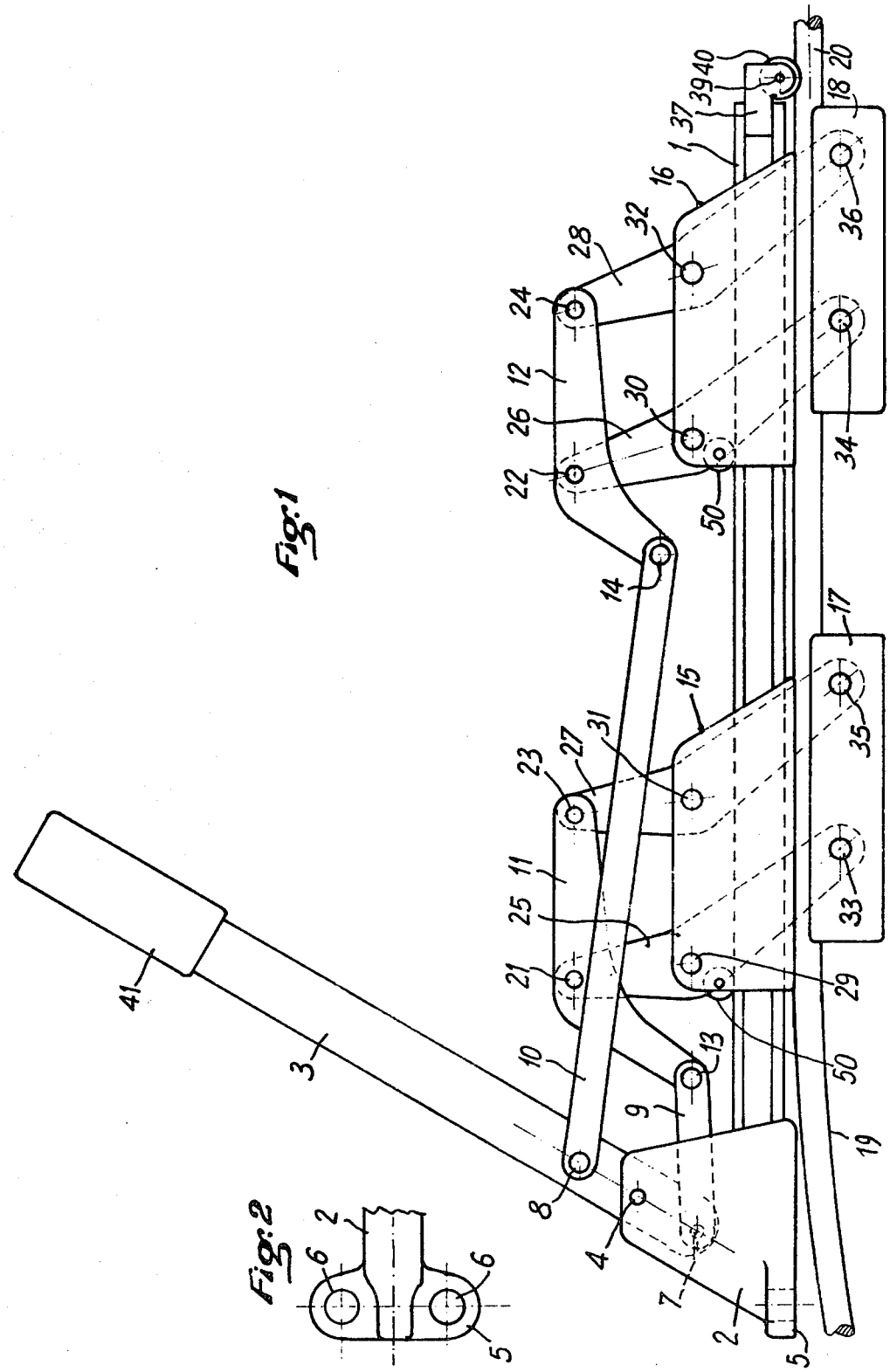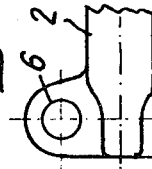

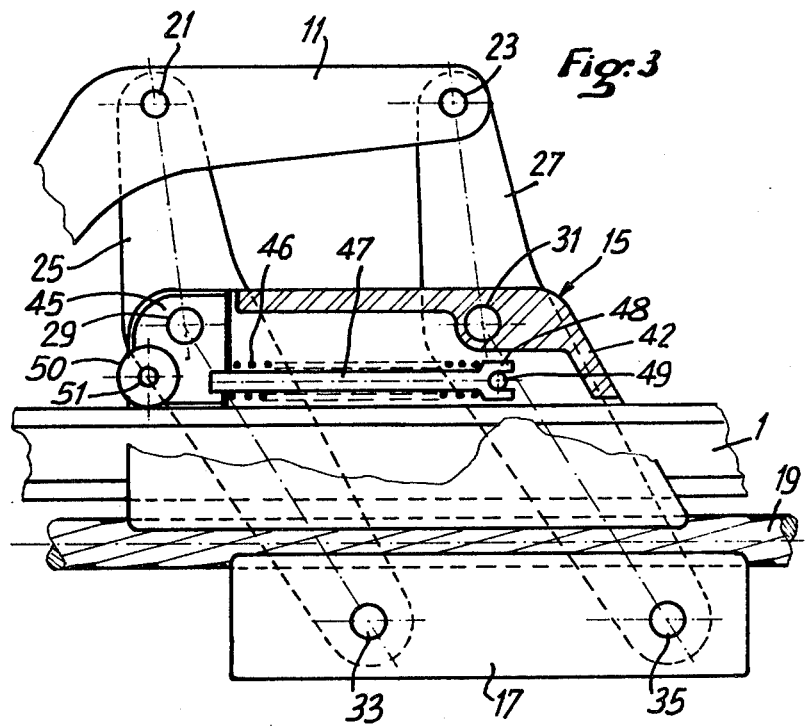
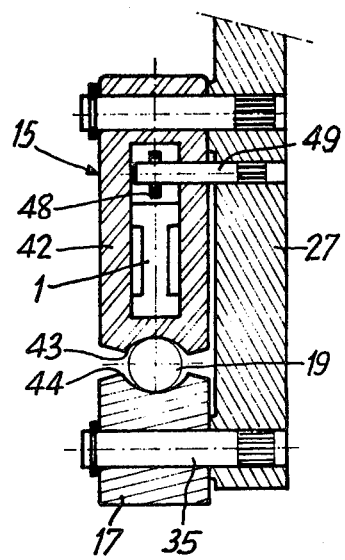
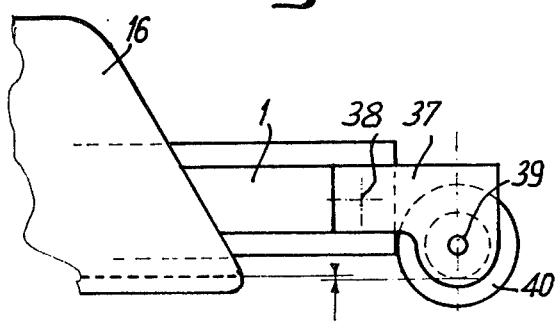
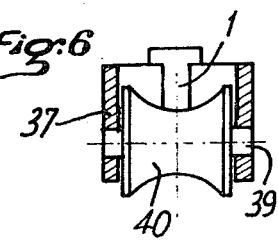

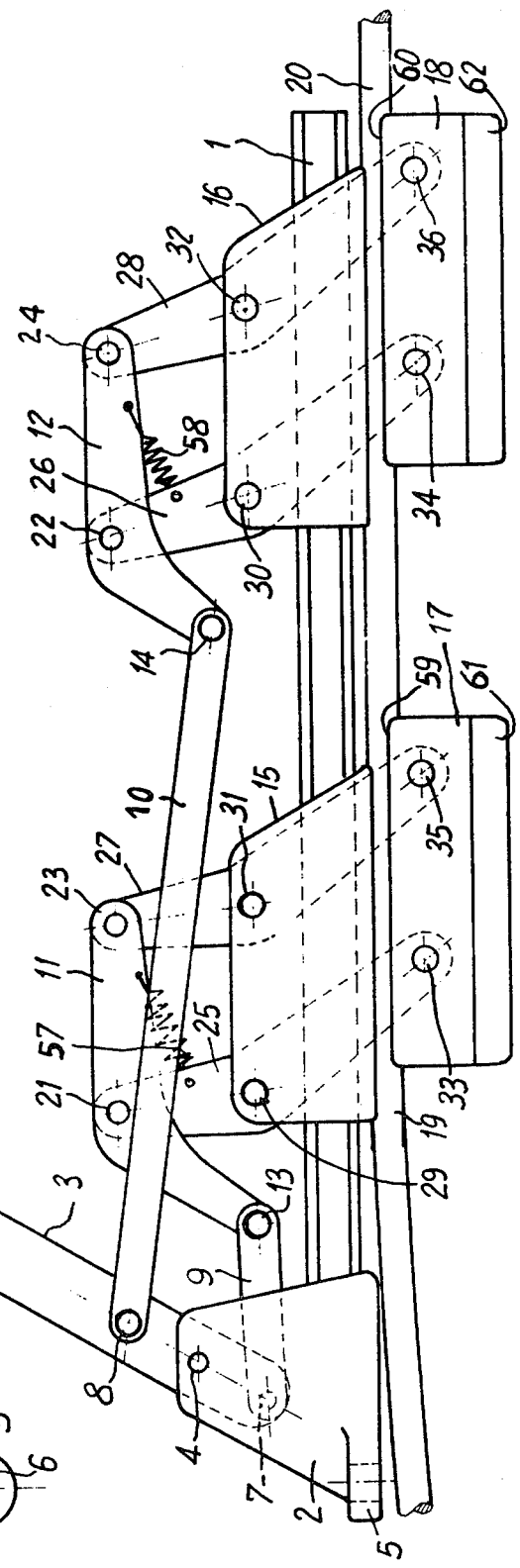

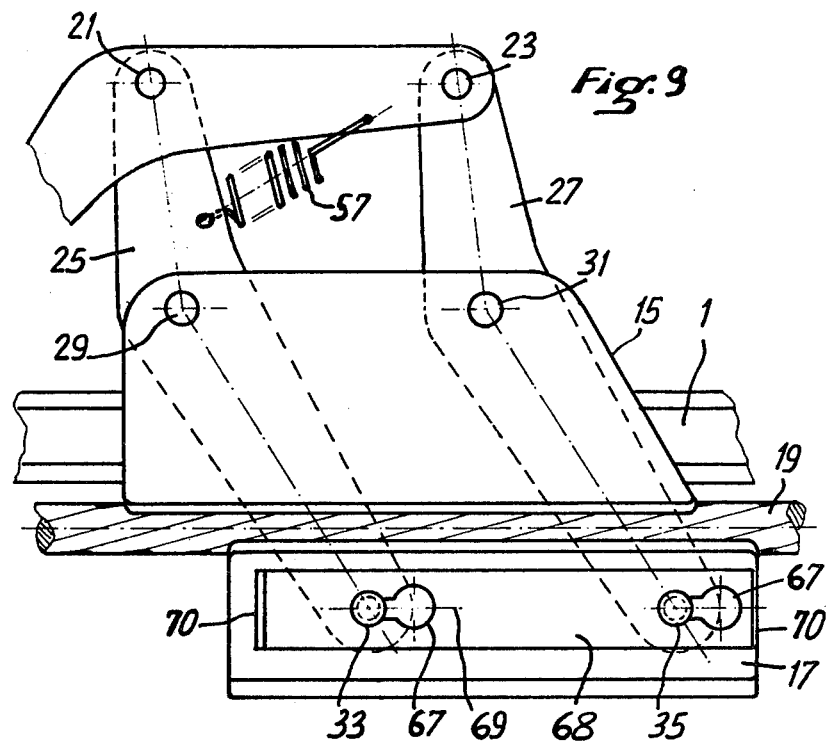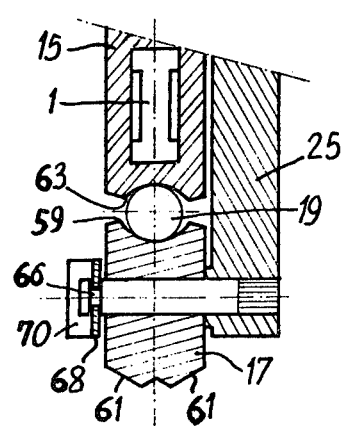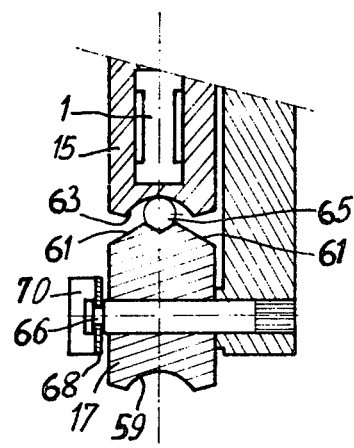

TRACTIVE APPARATUS FOR HAULING A CABLE, A BAR OR A SIMILAR MEMBER

BACKGROUND OF THE INVENTION

Tractive apparatus are known for hauling a cable by means of a lever system actuating two self-clamping grippers with a reciprocal movement which drives the two grippers in opposite directions while causing the gripper which moves in the haulage direction to clamp on the cable and the other gripper which moves in the opposite direction to be unclamped. Each of the grippers is formed by two opposite jaws between which the cable may be clamped and which are joined together by clamping links pivotably mounted on these two jaws.

Guiding of the reciprocal movement of the grippers may be provided by a rectilinear bar having an appropriate profile on which is guided a jaw of each gripper and at one end of which is pivotably mounted the operating lever which actuates two links pivotably mounted on this lever at two symmetrical points with respect to the pivoting point between the guide bar and the lever, these two links driving respectively the two grippers.

SUMMARY OF THE INVENTION

The principal aim of the invention is to improve the efficiency of a haulage apparatus of the above-mentioned type while using as simple a construction as possible. For this, the guide jaw of each gripper which forms the part of each clamping mechanism guided by the guide bar is constructed in the form of a hollow body through which the guide bar passes and which serves as housing and bearing point for a pre-clamping spring whose other end exerts its action on a clamping link actuating the other jaw of the clamping mechanism.

The pre-clamping spring may then be a compression spring whose end opposite its bearing point acts on a pin integral with a lateral clamping link and sliding in an appropriate opening in the corresponding lateral face of the guide jaw.

To reduce the friction and obtain good efficiency of the apparatus while facilitating operation thereof by using only a moderate force, the invention further uses the hollow body of each guided jaw for mounting a rolling roller in front of the jaw in the haulage direction, this roller rolling on the guide bar which passes through the jaw.

In addition, so that the cable is rapidly disengaged from the guided jaw which opens during a reversal of the actuation of the operating lever, the invention provides a roller which may be disposed at the free end of the guide bar so as to exert a reaction perpendicular to the axis of the stretched cable. This arrangement reduces the distance separating the jaws of an open gripper while allowing immediate reclosing thereof when the reciprocal movement is next reversed.

Moreover each gripper jaw generally comprises a single groove shape on its face facing the opposite jaw, this groove shape being adapted to a cable size so that a given tractive apparatus for hauling cables is only suitable for cable diameters between fairly narrow limits defining by the profiles of the grooves of its jaws. Using a deformable resilient material for the clamping faces of the jaws may allow a certain adaptation for clamping cables of slightly different diameters but the margin of variation of the cable diameters remains narrow.

The present invention also provides a particular construction of the jaws opposite the guided jaws designed so as to considerably increase the range of cable diameters compatible with the jaws of a tractive apparatus of the above-mentioned kind.

According to the present invention each unguided jaw is provided with two clamping faces and these jaws are mounted so as to bring one or other of the clamping faces of the opposite jaw opposite the guided jaw of each gripper.

This arrangement may first of all present the advantage, when the two opposite faces have identical profiles, of doubling the useful life of these jaws but, by using different groove profiles on the two clamping faces of the unguided jaws, the range of compatible cable diameters, especially, can be considerably widened, as will be explained in more detail hereafter.

In accordance with the invention, the unguided jaws are mounted in their two positions on the same pins as the clamping links so that these unguided jaws pass from one to the other of their longitudinal axis parallel to the guide bar, the housings provided in these jaws for the bearing pins taking up the same position through the above rotation. In one or other of the two mounting positions of an unguided jaw, this mounting may be completed by a particularly simple and practical locking system provided by sliding a lateral removable plate having appropriate buttonholes, a narrow edge part of which, in the locking position, engages in a corresponding peripheral groove of the bearing pin on which the buttonhole is engaged.

According to a complementary feature of the invention, the reversible jaws are formed or coated with a compressible material such as rubber or material of appropriate hardness so as to promote better retention and holding of the bar, of the cable and of the wire actuated by the apparatus without imposing the use of a special coating for the groove of the guided jaw.

BRIEF DESCRIPTION OF THE DRAWINGS

For a better understanding of the invention, one embodiment thereof will be described hereafter with reference to the accompanying schematical drawings in which:

FIG. 1 is a side view of a haulage apparatus according to a first form of embodiment thereof;

FIG. 2 is a top view of a detail of the anchoring end of the haulage apparatus of FIG. 1;

FIG. 3 is an enlarged side view of a gripper with a part of the hollow body of its guided jaw cut away;

FIG. 4 is a partial cross section of two jaws and a clamping link;

FIG. 5 is an end view of the guide bar opposite its anchoring end;

FIG. 6 is a detail showing an elevational view of one end of the guide bar equipped at its free and with a grooved roller for exerting a transverse reaction on the cable to be hauled;

FIG. 7 is a side view of the haulage apparatus according to another form of embodiment thereof;

FIG. 8 is a top view of a detail of the anchoring end of the haulage apparatus of FIG. 7;

FIG. 9 is an enlarged side view of one of the grippers; and

FIGS. 10 and 11 are two cross sections of part of the gripper showing the two different positions which the jaw opposite the guided jaw may assume.

DESCRIPTION OF THE PREFERRED EMBODIMENTS

In the example shown in the drawings, and more particularly in FIGS. 1 to 6, there is shown at 1 a guide bar formed for example by a metal I section whose contour is shown more completely in FIG. 4. At its anchoring end, the guide bar is integral with a base 2 on which the operating lever 3 is pivotably mounted by a pin 4. Base 2 may comprise an anchoring lug 5 which may have holes 6 for securing the apparatus. On each side of its pivot pin 4, the operating lever 3 is pivotably mounted by pins 7-8 on two actuating links 9-10 whose opposite ends are pivotably mounted on side plates 11-12 of the two grippers by pins 13-14. There is shown in FIG. 1 at 15-16 the guided jaws of two grippers forming the upper jaws whereas the lower jaws are shown at 17-18. Between the upper jaw and the lower jaw of each gripper passes the cable 19, of which the part situated on the stretched side is shown at 20.

On side plate 11 are pivotably mounted by pins 21-23 the two clamping links 25, 27 which are pivotably mounted on jaw 15 by pins 29, 31 and on jaw 17 by pins 33, 35. Similarly, on side plate 12 are pivotably mounted through pins 22, 24 the two clamping links 26, 28 which are in their turn pivotably mounted on jaw 16 by pins 30, 32 and on jaw 18 by pins 34, 36.

At the free end of the guide bar 1 is fixed a roller holder 37 formed by two bent side plates fixed at 38 (FIG. 5) to bar 1 and supporting the journals 39 of a grooved roller 40 intended to exert a reaction to the pressure of the cable towards the sliding jaw, generated by the force exerted on the operating lever by the operator.

Before describing more completely the construction of the guided jaws 15-16 with reference to FIGS. 3 to 5, the known principle of the operation of a tractive apparatus having two grippers reciprocating in opposite directions during the actuation of the operating lever which causes opposite rectilinear movements of the two grippers will be briefly described. If we assume that FIG. 1 shows the apparatus in the position in which the grippers are the furtherst apart, that is to say for the rightmost position of FIG. 1 of the actuating handle 41 of the operating lever 3, it will be understood that jaw 15 is in its leftmost position like pin 7 situated at the opposite end to handle 41 with respect to the pivot pin 4 of lever 3, whereas jaw 16 is in its right-most position. Therefore, if a pull is exerted on handle 41 in the opposite direction to the taut part of the cable 20; i.e. leftward in FIG. 1, a pull is exerted by link 10 on jaw 16 to the left and a push by link 9 to the right on jaw 15. The pull is exerted on jaw 16 causes gripper 16,18 to close whereas the push exerted on jaw 15 causes gripper 15,17 to open and the result is that cable 19 is hauled by jaw 16 until the handle 41 of lever 3 reaches its leftmost position in which the two grippers are in the positions the closest to each other. When the movement of lever 3 is reversed, the forces exerted on the two guided jaws 15-16 are reversed and, since these forces are applied through clamping links 25 to 28, these latter exert on the lower jaws 17-18 reversed forces which open jaw 18 of the pushed gripper and close jaw 17 of the pulled gripper, so that cable 19 is again hauled because of the double reversal of the direction of movement of the grippers and of the relative positions of the two jaws of each grippers.

The structure of the guided jaws 15-16 will now be described more completely with reference to FIGS. 3-4 showing the detail of the gripper formed by jaws 15,17. Jaw 15 is formed essentially by a hollow body 42 whose cavity is open at the front and at the rear so that there may pass therethrough guide bar 1 anchored in a fixed position during hauling. The lower external face of this hollow body 42 has a groove shaped profile 43 for clamping cable 19 between the two jaws 15,17 of the gripper in the closed position, the upper face of jaw 17 having a groove shaped profile 44 opposite profile 43.

The internal cavity of the hollow body 42 is closed above bar 1 towards the front, that is to say towards the actuating lever 3, by a stirrup piece 45 through which passes pin 29 and which serves as a support for a compression spring 46 forming a pre-clamping spring. This spring may be a helical spring wound around a mobile rod 47 between stirrup piece 45 and a head 48 by which rod 47 bears against a pin 49 integral with the lateral clamping link 27 and slidable in an appropriate recess formed in the lateral wall of the hollow body 42 disposed along link 27.

Towards the front and above bar 1 each guided jaw carries a roller 50 rotatable about its axis 51 so as to roll on the upper face of bar 1 thus considerably reducing the friction forces capable or resisting sliding of the guided jaws and so appreciably reducing the force to be applied to the actuating lever.

The above construction of the upper jaws thus provides better efficiency of the haulage apparatus while being particularly simple and enclosing the pre-clamping spring of each gripper inside the hollow body of its guided jaw in which this spring is protected for prolonged operation without deterioration.

Roller 40, at the rear end guide bar 1, is disposed so that the bottom of its groove extends slightly downwards beyond the bottom of the longitudinal groove of the adjacent upper jaw 16 so that the cable cannot abut against this jaw when the corresponding gripper is in the open position and slides over the cable while the other jaw advances towards the actuating lever while driving the cable. Such abutment would in fact have the disadvantage of unduly opening the mobile gripper with respect to the cable and disturbing the reversal of the action of the grippers when the movement of the actuating lever is reversed.

The hauling apparatus being the object of a second form of embodiment shown in FIGS. 7 to 11 comprises the same elements 1 to 36 as the hauling apparatus shown in FIGS. 1 to 6. As is shown schematically in FIG. 7, pre-clamping springs 37-38 are interposed respectively between links 25-26 and side plates 11-12.

The lower jaws 17-18 are reversible so as to present upwardly either a face 59-60 having a large radius groove or a face having a narrow groove between the two oblique lateral parts 61-62. Thus, it can be seen that the position of the lower jaws shown in FIG. 7 is that shown in section in FIG. 10 for the lower jaw 17; the upper face 59 of jaw 17 is then opposite a similar or identical face 63 also having a large radius of the guided upper jaw 15; the clamping face 64 of the other guided jaw 16 is identical to face 63.

Jaws 15,17 placed as is shown in FIGS. 7 to 10 would not be suitable for controlling the drawing of a cable 65 of much smaller diameter for this cable could not be clamped between the cooperating jaws of the same gripper. This is why, for pulling cable 65 (FIG. 11), the position of jaw 17 is reversed (and also of course that of jaw 18), as is shown in FIG. 11, while keeping the same clamping faces 63-64 for the guided upper jaws 15-16, for a narrow groove may cooperate with a wide groove as shown in FIG. 11.

The reversal of the lower jaws 17-18 and locking thereof in one or other of their two positions may be provided very simply and very practically by the device shown in FIGS. 9 to 11.

Pins 33-36, intended for receiving the lower jaws 17-18, finish at the end of these lower jaws in an end having a peripheral groove 66 in which may be fitted the periphery of the narrow part of a buttonhole 67 provided in a lateral locking plate 68 extending over the length of the external face of each lower jaw 17-18. The buttonholes 67 are symmetrical with respect to a longitudinal median line 69 and the ends 70 of plate 68 are bent back outwardly so as to facilitate operation of each plate 68. If, from the locking position shown in FIG. 9, plate 68 is moved in the direction of line 69 so as to bring the wide parts of the two buttonholes of the plate in the position of the narrow parts, it becomes possible to withdraw plate 68 and the lower jaw then to put this latter back in place, after reversing it, then to lock it in its new position by engaging plate 68 on the bearing pins through the wide parts of the buttonholes, then bringing the plate into the locking position in which the narrow parts of the buttonholes are engaged in grooves 66.

What I claim is:

1. An apparatus for pulling a cable, a bar or a wire, which comprises:
    (a) a guide bar having an I section,
    (b) an operating lever pivoted at a forward end of said guide bar,
    (c) two clamping mechanisms disposed one behind the other and each comprising:
        (d) a hollow upper jaw through which passes said guide bar and adapted to slide along said guide bar, the lower face of the hollow upper jaw presenting a clamping profile such as a groove,
        (e) a movable lower jaw disposed under said upper jaw and having an upper face which presents a clamping profile such as a groove adapted to co-act with said clamping profile of the upper jaw to ensure the clamping of a cable or bar,
        (f) clamping links disposed on each side of said clamping mechanism, each clamping link being pivoted at an intermediate part to the upper jaw and at a lower part to the lower jaw,
        (g) side plates pivoted at the upper ends of said clamping links,
        (h) at least one pre-clamping spring acting on one of said clamping links to urge same to a position which ensures a clamping of the cable or bar between said upper and lower jaws, said pre-clamping spring being disposed inside the hollow body of the upper jaw and bearing by one end against a transverse portion of the forward end of the upper jaw while its opposite end engages a lateral projection of the clamping links, said lateral projection passing through a side recess of the upper body of the upper jaw,
        (i) a first connecting link pivoted on the one hand to the forward end of the side plates of a first of said two clamping mechanisms and on the other hand to the lower end of the operating lever at a level under the pivot axis of said operating lever to the end of the guide bar, and
        (j) a second connecting link pivoted on the one hand to the forward end of the side plates of the second of said two clamping mechanisms and on the other hand to the lower end of the operating lever at a level above the pivot axis of said operating lever to the end of the guide bar.

2. An apparatus for pulling a cable, a bar or a wire, which comprises:
    (a) a guide bar having an I section,
    (b) an operating lever pivoted at a forward end of said guide bar,
    (c) two clamping mechanisms disposed one behind the other and each comprising:
        (d) a hollow upper jaw through which passes said guide bar and adapted to slide along said guide bar, the lower face of the hollow upper jaw presenting a clamping profile such as a groove,
        (e) a movable lower jaw disposed under said upper jaw and having an upper face which presents a clamping profile such as a groove adapted to co-act with said clamping profile of the upper jaw to ensure the clamping of a cable or bar,
        (f) clamping links disposed on each side of said clamping mechanism, each clamping link being pivoted at an intermediate part to the upper jaw and at a lower part to the lower jaw,
        (g) side plates pivoted at the upper ends of said clamping links,
        (h) at least one pre-clamping spring acting on one of said clamping links to urge same to a position which ensures a clamping of the cable or bar between said upper and lower jaws, said pre-clamping spring being disposed inside the hollow body of the upper jaw, bearing by one end against a transverse stirrup piece closing the forward end of the upper jaw, being wound about a mobile rod and having its opposite end which bears on a head portion of said rod, this head portion bearing against a pin integral with a clamping link and slidable in a side recess of the body of the upper jaw,
        (i) a first connecting link pivoted on the one hand to the forward end of the side plates of a first of said two clamping mechanisms and on the other hand to the lower end of the operating lever at a level under the pivot axis of said operating lever to the end of the guide bar, and
        (j) a second connecting link pivoted on the one hand to the forward end of the side plates of the second of said two clamping mechanisms and on the other hand to the lower end of the operating lever at a level above the pivot axis of said operating lever to the end of the guide bar.

3. The apparatus as claimed in claim 2, wherein each upper jaw slides by rolling over the face of the guide bar opposite the one situated on the same side as the clamping groove of said jaw, by means of a roller rotatably mounted on a pin fixed in each of the lateral walls of said upper jaw.

4. The apparatus as claimed in claim 3, wherein the guide bar comprises, at its end opposite that by which it is pivotably mounted to the operating lever, a piece supporting a guide element shaped as a roller disposed so as to exert, on the part of the cable stretched by the pulling force, a reaction, perpendicular to the axis of the cable, disengaging it from the upper jaw of a clamping mechanism acting on the cable when the lower jaw of the same clamping mechanism moves away therefrom.

5. An apparatus for pulling a cable, a bar or a wire, which comprises:
  (a) a guide bar having an I section,
  (b) an operating lever pivoted at a forward end of said guide bar,
  (c) two clamping mechanisms disposed one behind the other and each comprising:
    (d) a hollow upper jaw through which passes said guide bar and adapted to slide along said guide bar, the lower face of the hollow upper jaw presenting a clamping profile such as a groove,
    (e) a removable lower jaw disposed under said upper jaw and having an upper face which presents a first clamping profile such as a groove adapted to co-act with said clamping profile of the upper jaw to ensure the clamping of a cable or bar, while the lower face of said lower jaw presents a second clamping profile different from said first clamping profile and adapted also to co-act with the clamping profile of the upper jaw to ensure the clamping of two different categories of cable or bar by a 180° rotation of the lower jaw about an axis parallel to the guide bar,
    (f) clamping links disposed on each side of said clamping mechanism, each clamping link being pivoted at an intermediate part to the upper jaw and at a lower part to the lower jaw,
    (g) side plates pivoted at the upper ends of said clamping links,
    (h) at least one pre-clamping spring acting on one of said clamping links to urge same to a position which ensures a clamping of the cable or bar between said upper and lower jaws,
  (i) a first connecting link pivoted on the one hand to the forward end of the side plates of a first of said two clamping mechanisms and on the other hand to the lower end of the operating lever at a level under the pivot axis of said operating lever to the end of the guide bar, and
  (j) a second connecting link pivoted on the one hand to the forward end of the side plates of the second of said two clamping mechanisms and on the other hand to the lower end of the operating lever at a level above said pivot axis of the operating lever to the end of the guide bar, the lower jaw of each clamping mechanism being removably fixed on pivot pins connecting it to said clamping links, by means of a lateral plate in which buttonholes provide, through sliding of said plate, locking or unlocking of said removable lower jaw on grooves of the pins, whose position corresponds to that of the buttonholes of said lateral plate.

6. The apparatus as claimed in claim 5, wherein the upper and lower faces of the upper jaw of each clamping mechanism have different clamping profiles so as to allow clamping of two different categories of cable or bar.

7. The apparatus as claimed in 6, wherein the lower jaw of each clamping mechanism is removably fixed on pivot pins connecting it to said clamping links, by means of a lateral plate in which buttonholes provide, through sliding of said plate, locking or unlocking of said removable lower jaw on grooves of the pins, whose position corresponds to that of the buttonholes of said lateral plate.

8. The apparatus as claimed in 7, wherein said removable lower jaw of each clamping mechanism is formed from or coated with a compressible material such as rubber or a material of appropriate hardness so as to promote better retention and holding of the bar, of the cable or of the wire used, without it being necessary for all that to coat the groove of the upper jaw of the clamping mechanism with a special material.

9. The apparatus as claimed in claim 5 wherein said removable lower jaw of each clamping mechanism is formed from or coated with a compressible material such as rubber or a material of appropriate hardness so as to promote better retention and holding of the bar, of the cable or of the wire used, without it being necessary for all that to coat the groove of the upper jaw of the clamping mechanism with a special material.

* * * * *